United States Patent [19]

Malone

[11] 4,257,184
[45] Mar. 24, 1981

[54] ANIMAL TRAP

[76] Inventor: Randall P. Malone, General Delivery, Gold Bridge, British Columbia, Canada, V0K 1P0

[21] Appl. No.: 54,675

[22] Filed: Jul. 5, 1979

[51] Int. Cl.³ .......................................... A01M 23/26
[52] U.S. Cl. ..................................................... 43/92
[58] Field of Search .................... 43/88, 92, 93, 85, 82

[56] References Cited

U.S. PATENT DOCUMENTS

| | | | |
|---|---|---|---|
| 904,024 | 11/1908 | Sprague | 43/92 |
| 1,005,667 | 10/1911 | Steffens | 43/92 |
| 1,790,432 | 1/1931 | Mackey | 43/92 |
| 1,948,199 | 2/1934 | Booth | 43/82 |

Primary Examiner—Nicholas P. Godici

Attorney, Agent, or Firm—Carver & Company

[57] ABSTRACT

An animal trap comprises a base member with two jaws pivotally connected thereto. Rings extend slidably about adjacent side members of the jaws and springs bias the rings away from the base member and towards end members of the jaws to move the jaws from a horizontal, open position to a vertical, closed position. A bell crank is pivotally connected to the base member and has an upwardly moveable portion where bait is secured. An elongate rod is pivotally connected to the bell crank at one end and engages one of the side members at a second end, when the jaws are horizontal, to maintain the trap in the open position. When an animal tugs on the bait, the rod disengages from the one side member and the trap closes to trap the head of the animal.

2 Claims, 3 Drawing Figures

ANIMAL TRAP

BACKGROUND OF THE INVENTION

1. Field of the Invention

This invention relates to a humane animal trap for trapping the head of the animal.

2. Prior Art

The public outcry in recent years against inhumane trapping methods and traps, particularly the leghold trap, has led to a considerable demand for traps which will reduce the suffering of the animal. One approach to the problem has been the development of traps adapted to close on the neck of the animal, resulting in a quick death by suffocation, breakage of the neck or damage to vital organs. These traps normally employ a pair of jaws which are horizontal in the open position and have springs for biasing the jaws towards the vertical closed position. These jaws are large and normally can encompass the legs and heads of the animals. One of the problems with these types of traps, however, is that practically all of them can be released by a sideways motion of the bait holders which also act as triggers. Quite a number of animals normally first test the bait with their paws without putting their heads too close to the bait and when this occurs the trap can be sprung by sideways motion of the trigger and usually catches the leg of the animal rather than its head.

In order to prevent this type of occurrence some prior art traps used wires which secure the bait to the triggers so as to obtain a release of the trap only when the wire is tightened. However, this type of trap can be sprung if the animal strikes or pulls the wire with its leg or paw.

SUMMARY OF THE INVENTION

According to the invention, an animal trap comprises a base member and two jaws. Each jaw comprises two generally parallel side members with proximal ends pivotally connected to the base member and an end member interconnecting distal ends of the side members. There are two rings, each extending slidably about adjacent said side members of the jaws. Resilient means biases the rings away from the base member and towards the end members of the jaws to move the jaws from a generally horizontal, open position to a generally vertical, closed position where the end members and the corresponding side members are adjacent each other. Latch means engages one of the side members adjacent one of the rings when the jaws are in the open position, and the rings are adjacent the base member, to maintain the jaws in the open position. Upwardly moveable trigger means has means for securing bait. The trigger means is connected to the latch means so, when an animal tugs the bait, the trigger means moves upwardly and disengages the latch means from the one member and permits the resilient means to move the jaws towards the closed position to trap the head of the animal between the jaws.

DESCRIPTION OF THE PREFERRED EMBODIMENTS

Figure 1:
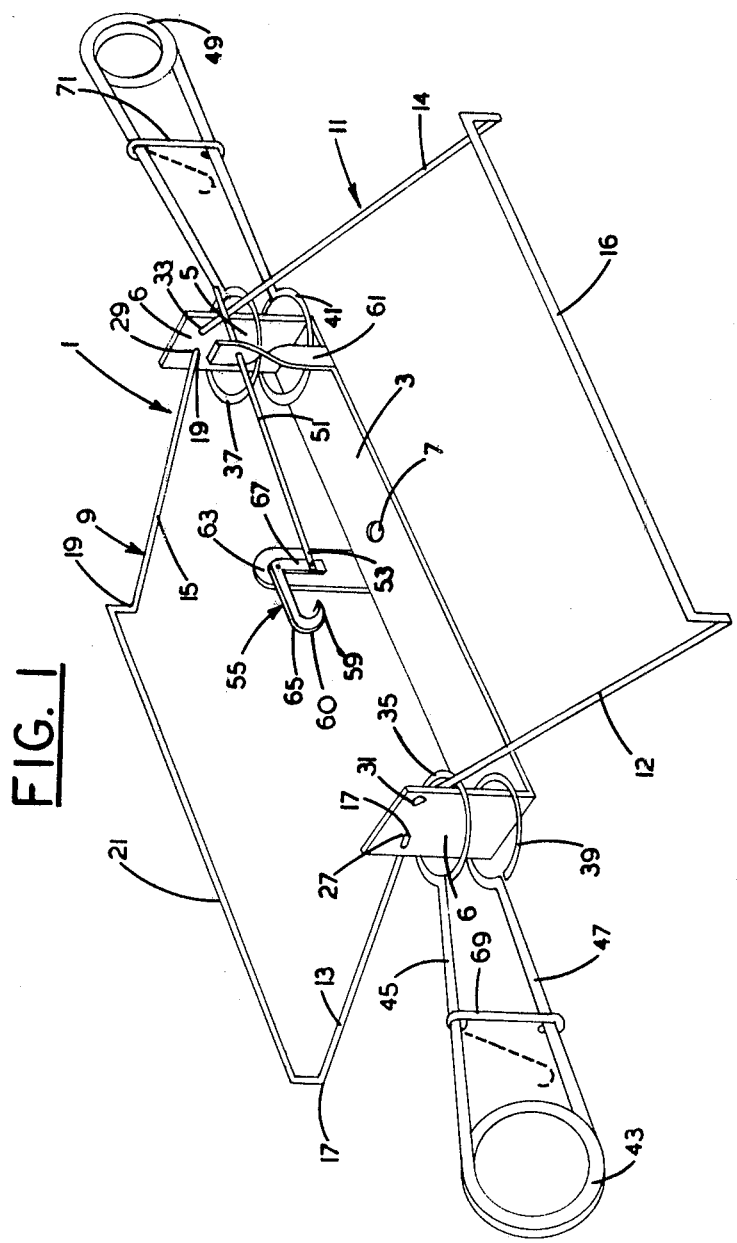
FIG. 1 is an isometric view showing a trap according to an embodiment of the invention in the open position.

Referring to the drawings, the animal trap 1 has a base member 3 comprising a strip of sheet metal with upturned ends 5 and 6. The base member 3 has an aperture 7 for receiving an anchor pin not comprising part of the invention.

Trap 1 has a pair of jaws 9 and 11. Jaw 9 has two parallel side members 13 and 15 with distal ends 17 and 19, respectively, interconnected by end member 21. The ends 23 and 25 of members 9 and 11 proximal base member 3 are hook shaped and project through apertures 27 and 29 of the base member 3 to pivotally connect jaw 9 to the base member. Jaw 11 is identical to jaw 9 with side members 12 and 14, an end member 16 and is pivotally connected to base member 3 at apertures 31 and 33.

Figure 2:
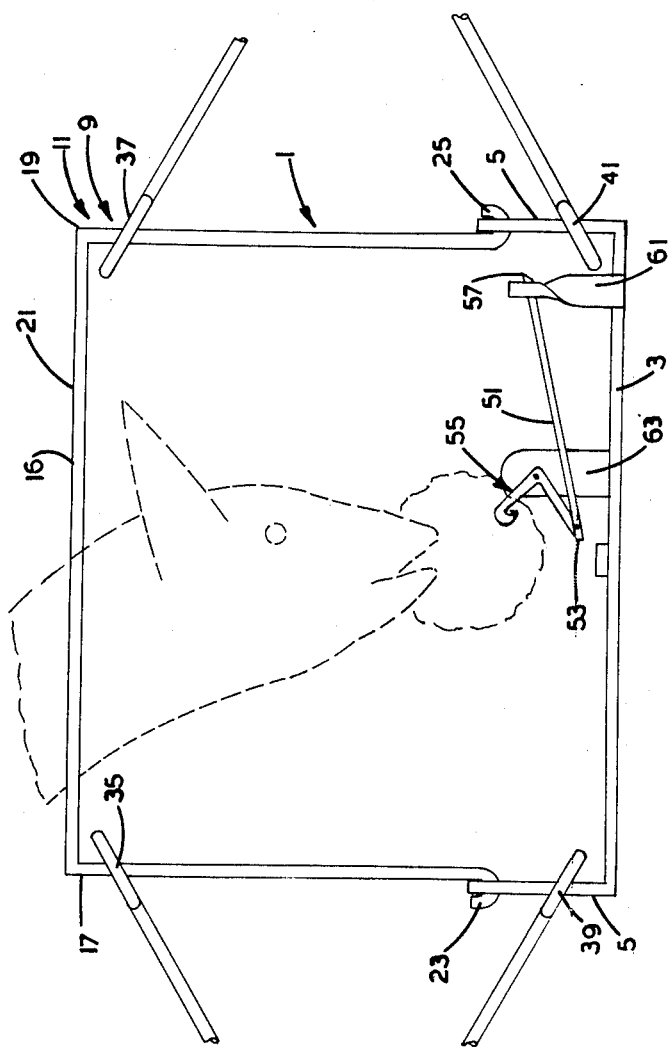
FIG. 2 is an elevational view showing the trap of FIG. 1 in the closed position.

Trap 1 has a pair of upper rings 35 and 37 which freely embrace ends 5 and 6 of the trap in the open position of the trap shown in FIG. 1 and which extend slidably about adjacent side members of jaws 9 and 11 as the jaws move upwards towards the closed position of FIG. 2.

Lower rings 39 and 41 extend about ends 5 and 6 of base member 3 below upper rings 35 and 37 respectively. A coil spring member 43 has an elongate extension 45 integrally connected to upper ring 35 with another elongate extension 47 connected to lower ring 39 and provides means resiliently biasing ring 35 away from base member 3 and towards the position against the end members 21 and 16 of the jaws 9 and 11, as seen in FIG. 2. An identical coil spring member 49 similarly biases ring 37. Spring members 43 and 49, with rings 35 and 37, tend to move jaws 9 and 11 from the generally horizontal, open position, shown in FIG. 1, towards the generally vertical, closed position shown in FIG. 2.

Figure 3:
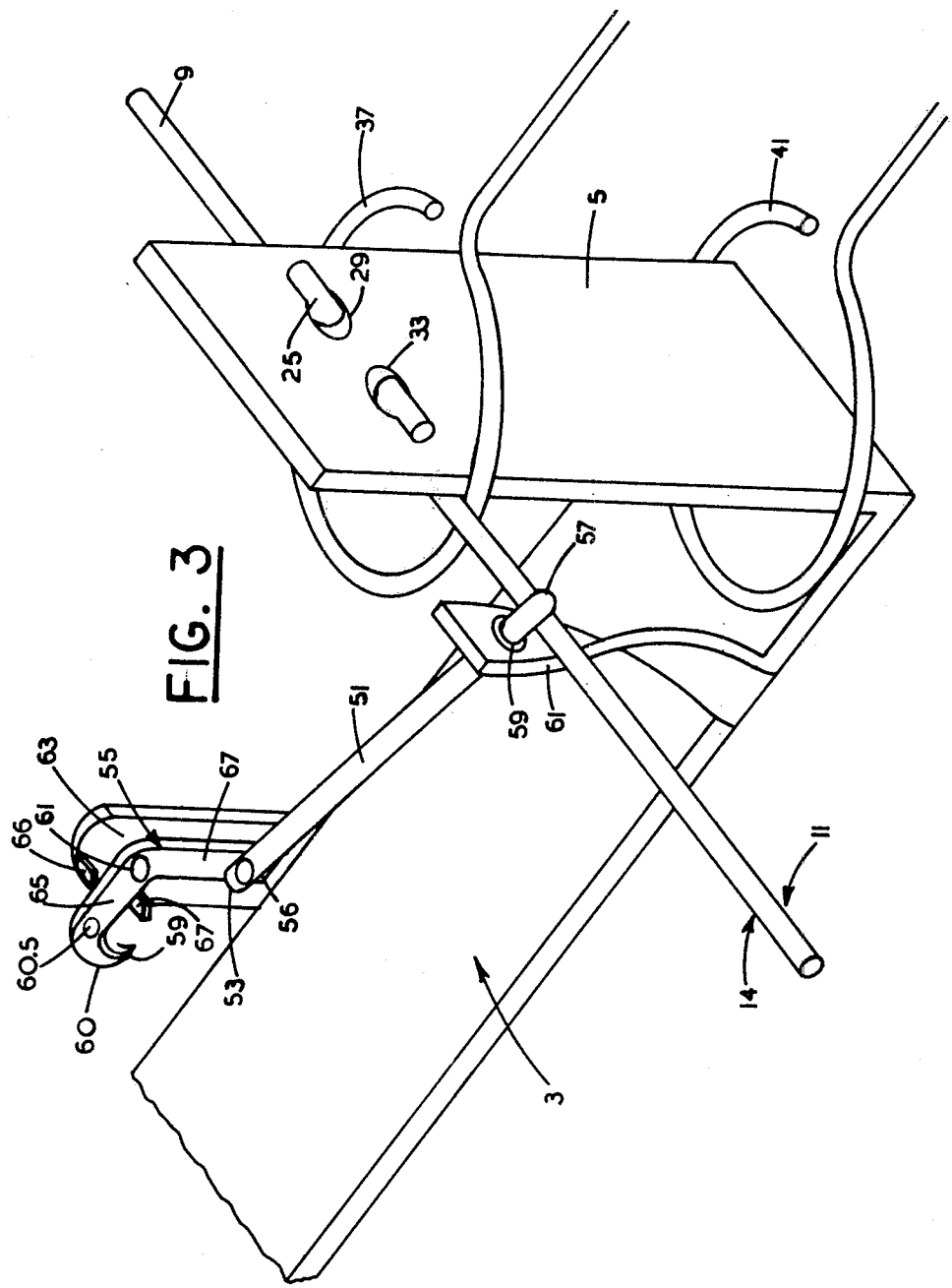
FIG. 3 is an enlarged fragmentary view showing the latch mechanism of the trap.

Trap 1 has a latch means for maintaining jaws 9 and 11 in the open position of FIG. 1 which comprises an elongated rod 51. The first end 53 of rod 51, as seen in FIG. 3, is pivotally connected to bell crank 55, described below. The second end 57 of rod 51 projects slidably through aperture 59 on upwardly extending tab 61 which is connected at its lower end to base member 3. End 57 of rod 51 extends over one side member 14 of jaw 11 and exerts a downward force on jaw 11 and ring 37 to maintain the jaws in the open position.

Trap 1 has a trigger means for releasing the jaws from the open position comprising the lever or bell crank 55 mentioned above. Lever 55 has a barbed hook 59 at a first end 60 and an aperture 60.5 for securing bait to the trap, and is pivotally connected to rod 51 near its second end 56. At its mid point 61, lever 55 is pivotally connected to upwardly extending tab 63 of base member 3. Lever 55 has a horizontal portion 65 extending from first end 59 to mid point 61 and a vertical portion 67 extending downwardly from mid point 61 to rod 51. Swinging of the lever is limited by stops 66 and 67 extending from the tab 63.

In operation, the trap 1 is set by compressing spring members 43 and 49 downwardly from the closed position of FIG. 2 until rings 35 and 37 extend about upturned ends 5 and 6 of base member 3. Hooks 69 and 71 can then be used to temporarily keep the spring members compressed as shown in solid lines in FIG. 1. The bait is secured to the hook or first end 60 of trigger means or lever 55. After the bait is secured, horizontal portion 65 of lever 55 is pushed downwardly and this moves latch means or rod 51 outwardly so its end 57 projects over and engages side member 14 of jaw 11. As explained above, this will maintain the trap in the open position and hooks 69 and 71 can be released from spring members 43 and 49 as seen in broken lines in FIG. 1.

When an animal approaches the trap, it may test the bait and the trap with its paws. However, the trap will not be sprung by any sideways or downwards force on lever 55, but only by an upwards force. The only effective way that any common fur bearing animal can exert such an upwards force is by tugging on the bait secured to the hook at first end 60 of lever 55 with its teeth. This pivots horizontal portion 65 of lever 55 upwardly about mid position 61 and pulls rod 51 inwardly. When rod 51 is pulled inwardly, its end 57 slides through aperture 59 of tab 61 and disengages from side member 14 of jaw 11. Spring members 43 and 49 and rings 35 and 37 are then free to snap jaws 9 and 11 upwardly to the closed position of FIG. 2. The size of the trap is selected for the animal being trapped so the neck of the animal is caught between jaws 9 and 11, resulting in a humane death. Trap 1 cannot easily be sprung by the paw of the animal as can other traps designed to trap its head.

I claim:

1. An animal trap comprising:
   a base member;
   two jaws, each said jaw comprising two generally parallel side members with proximal ends pivotally connected to the base member, and an end member interconnecting distal ends of the side members;
   a tab connected to the base member adjacent one said side member, the tab having an aperture;
   two rings, each said ring extending slidably about adjacent said side members of the jaws;
   resilient means biasing the rings away from the base member and towards the end members of the jaws to move the jaws from a generally horizontal, open position to a generally vertical, closed position where the end members and corresponding said side members are adjacent each other;
   upwardly moveable trigger means comprising a lever having a first end and a second end, the lever being pivotally connected to the base member at a mid position between the first end and the second end, the lever having a horizontal portion between the first end and the mid position and a vertical portion between the mid position and the second end;
   latch means for engaging one of the side members when the jaws are in the open position, and the rings are adjacent the base member, to maintain the jaws in the open position, the latch means comprising an elongate rod having a first end pivotally connected to the vertical portion of the lever, the aperture of the tab slidably receiving a second end of the rod, the second end of the rod projecting through the aperture and over the one side member to maintain the jaws in the open position;
   means for securing bait on the horizontal portion of the lever so, when an animal tugs the bait, the first end of the lever moves upwardly and the latch means disengages from the one member, permitting the resilient means to move the jaws towards the closed position to trap the head of the animal between the jaws.

2. A trap as claimed in claim 1, the lever comprising a bell crank.

* * * * *